(12) United States Patent
Liu et al.

(10) Patent No.: US 7,728,865 B2
(45) Date of Patent: Jun. 1, 2010

(54) BEAM IMPRINTING DISK

(75) Inventors: Ming-Hsun Liu, Taipei (TW); Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 13 days.

(21) Appl. No.: 12/193,006

(22) Filed: Aug. 16, 2008

(65) Prior Publication Data

US 2010/0039491 A1  Feb. 18, 2010

(51) Int. Cl.
*G11B 7/24* (2006.01)
(52) U.S. Cl. .................... 347/262; 347/264; 369/273
(58) Field of Classification Search ................ 347/262, 347/264; 369/272.1, 273
See application file for complete search history.

(56) References Cited

U.S. PATENT DOCUMENTS

| 5,608,717 | A | 3/1997 | Ito et al. | |
|---|---|---|---|---|
| 5,675,570 | A | 10/1997 | Ohira et al. | |
| 5,982,737 | A | 11/1999 | Takagishi et al. | |
| 6,490,239 | B1 | 12/2002 | Nagasaka | |
| 6,735,166 | B1 | 5/2004 | Kusafuka et al. | |
| 7,015,939 | B2 * | 3/2006 | Honda et al. | 347/225 |
| 7,268,794 | B2 * | 9/2007 | Honda et al. | 347/224 |
| 7,336,292 | B2 * | 2/2008 | Honda et al. | 347/224 |
| 7,336,293 | B2 * | 2/2008 | Honda et al. | 347/224 |
| 7,436,420 | B2 * | 10/2008 | Honda et al. | 347/224 |
| 7,471,305 | B2 * | 12/2008 | Honda et al. | 347/224 |
| 7,561,174 | B2 * | 7/2009 | Honda et al. | 347/224 |
| 2009/0135688 | A1 * | 5/2009 | Takeshima | 369/47.1 |

FOREIGN PATENT DOCUMENTS

| JP | 2002-092965 | * | 3/2002 |
|---|---|---|---|
| JP | 2004-227716 | * | 8/2004 |

* cited by examiner

*Primary Examiner*—Huan H Tran
(74) *Attorney, Agent, or Firm*—Banger Shia

(57) ABSTRACT

A beam imprinting disk which is provided with a supporting layer, a photosensitive printing layer is formed on the supporting layer, and a paint printing layer is formed on the photosensitive printing layer. One surface of the disk is a data-rewriting surface for writing data, and the other surface of the disk is a label predetermined surface for setting patterns and words. The photosensitive printing layer is disposed on the label predetermined surface of the disk, the paint printing layer is partially disposed on the photosensitive printing layer, so that the user can simultaneously see the photosensitive printing layer and the paint printing layer from the label predetermined surface. By such arrangements, the disk is applicable to the ink jet printer or the beam imprinting optical disk drive, so that the beam imprinting disk has a wide range of application and can meet different user's requirements.

5 Claims, 10 Drawing Sheets

BEAM IMPRINTING DISK

BACKGROUND OF THE INVENTION

1. Field of the Invention

The present invention relates to a beam imprinting disk for storing data, sound or video, and more particularly to a beam imprinting disk which can be selectively used to perform beam imprinting or paint printing by providing with an area for paint printing.

2. Description of the Prior Art

Using optical medium to store data has the advantages of small size and large capacity, so the optical medium has been widely used in the industries of software, audio-video selling or lending, or even widely used to duplicate data or rewrite display film since the popularization of the rewriter.

After rewriting the disk, the user always write a label on a label predetermined surface. Conventionally, the user firstly writes the label on a paster by using a pen, and then sticks the paster on the label predetermined surface, or directly writes on the label predetermined surface by using an oil pen. The latter method is convenient, but the manufactured label is unbeautiful, and the user can only write ordinary words and cannot manufacture beautiful patterns. Therefore, an optical printing disk which can utilize the printer and the rewriter to print is developed, which allows the consumer to manufacture beautiful and professional patterns and words on the label predetermined surface of the disk by himself/herself.

Referring to FIG. 1, an ink jet disk 10 which can utilize the printer to print is shown, which is provided with a supporting layer 11, a full rewriting layer 12 is formed on the supporting layer 11, and a full ink layer 13 is formed on the rewriting layer 12. By such arrangements, the ink jet disk 10 can be fed into the printer to manufacture patterns and words on the ink layer 13, such that the manufactured patterns and words have dark and light colors, but such an ink jet disk 10 must be cooperated with a special ink jet printer.

Referring to FIG. 2, an optical printing disk 20 which can utilize the rewriter to print is shown, which is provided with a supporting layer 21, and a photosensitive rewriting layer 22 is formed on the supporting layer 21. A bottom surface of the supporting layer 21 of the optical printing disk 20 is a data-rewriting surface 23, and a top surface of the photosensitive rewriting layer 22 is a label predetermined surface 24. The data-rewriting surface 23 is provided for rewriting the data. After the user places a beam imprinting optical disk drive under the opposite surface of the label predetermined surface 24, the beam imprinting optical disk drive will send out different laser beams to expose the photosensitive rewriting layer 22, so as to produce different transparency at different positions by different exposure times, thus producing the patterns. However, such an optical printing disk 20 has some disadvantages, such as, it must cooperate with the beam imprinting optical disk drive to use and takes a lot of time to produce the patterns, for example, each disk costs 5-20 minutes, and is formed with a gradient layer with a single color and cannot be formed with colorful patterns.

The present invention has arisen to mitigate and/or obviate the afore-described disadvantages.

SUMMARY OF THE INVENTION

The technical problems that needed to be solved:

The conventional printable disk is mainly divided into two kinds: such as, the ink jet disk and the optical printing disk. The common disadvantage of these disks is that they can only be used on special ink jet printers or beam imprinting optical disk drives, so that such disks have a limited application scope and cannot meet different user's requirements.

The technical characteristics for solving the problems:

The present invention is to provide a beam imprinting disk which is provided with a supporting layer, a photosensitive printing layer is formed on the supporting layer, and a paint printing layer is formed on the photosensitive printing layer. One surface of the disk is a data-rewriting surface for writing data, and the other surface of the disk is a label predetermined surface for setting patterns and words. The photosensitive printing layer is disposed on the label predetermined surface of the disk, which allows an optical disk drive to rewrite or read the data via the supporting layer when passing through the data-rewriting surface of the disk, or to perform beam imprinting directly via the label predetermined surface. The paint printing layer is partially disposed on the photosensitive printing layer of the label predetermined surface, so that the user can simultaneously see the photosensitive printing layer and the paint printing layer from the label predetermined surface.

The advantages of the present invention compared with the prior art:

The primary objective of the present invention is to provide a beam imprinting disk, the paint printing layer is partially disposed on the photosensitive printing layer of the disk, so that the user can simultaneously see the photosensitive printing layer and the paint printing layer from the label predetermined surface. At the same time, the beam imprinting can be performed to set the labels or patterns on the photosensitive printing layer, and the ink jet printer can be used to spray the labels or patterns on the paint printing layer. By such two methods, the disk is applicable to the ink jet printer or the beam imprinting optical disk drive, so that the present invention has a wide range of application and can meet different user's requirements.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
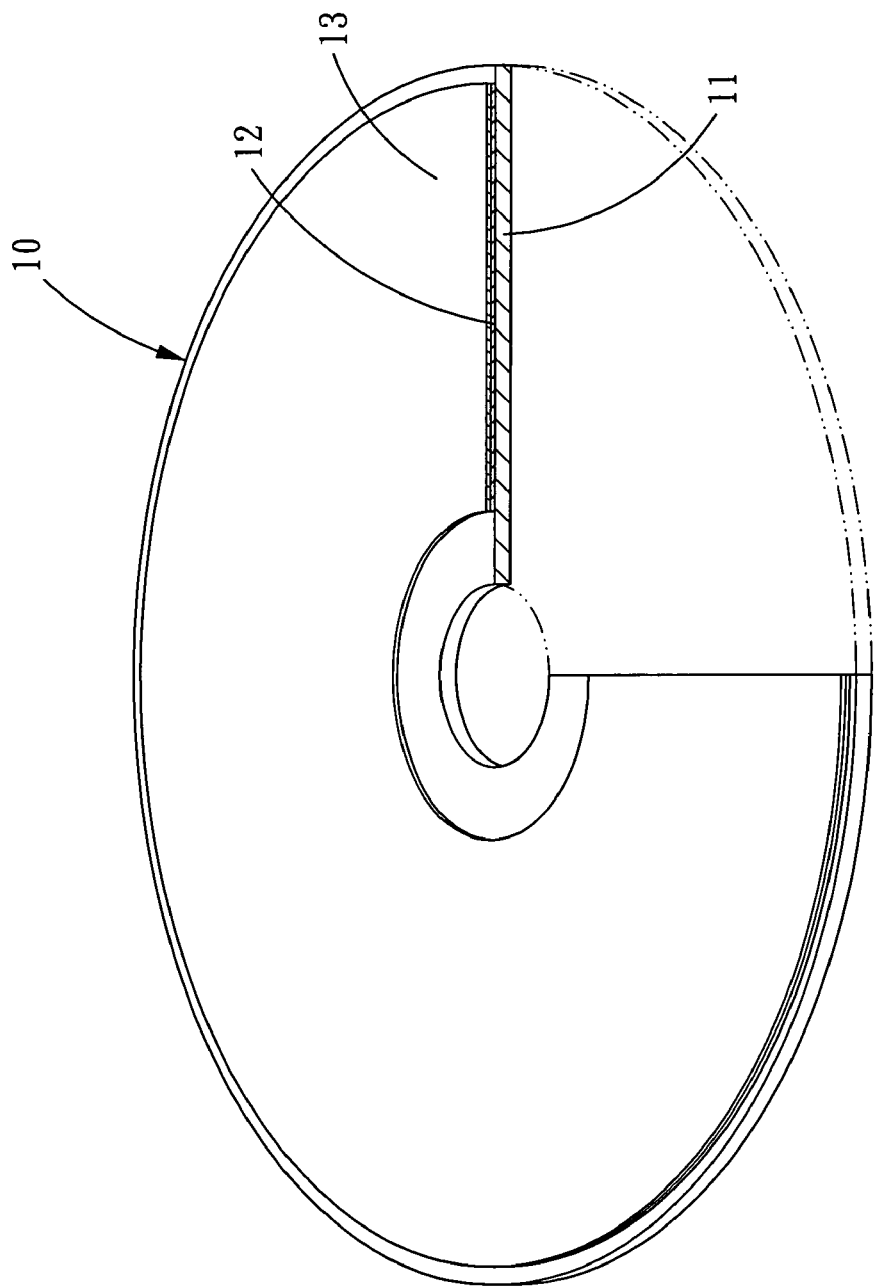
FIG. 1 is a perspective and a partial cross sectional view of a conventional ink jet disk.
Figure 2:
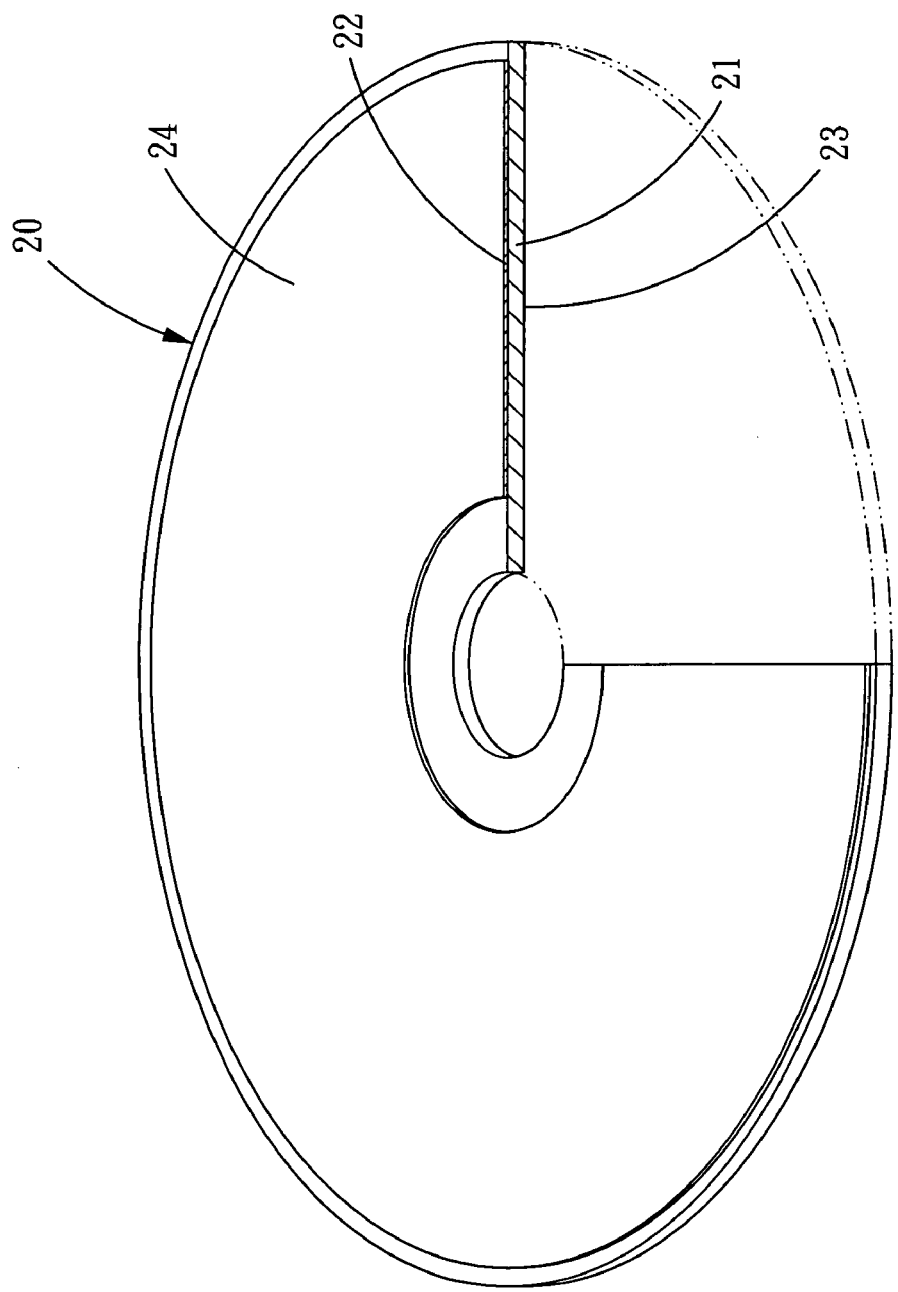
FIG. 2 is a perspective and a partial cross sectional view of a conventional optical printing disk.
Figure 3:
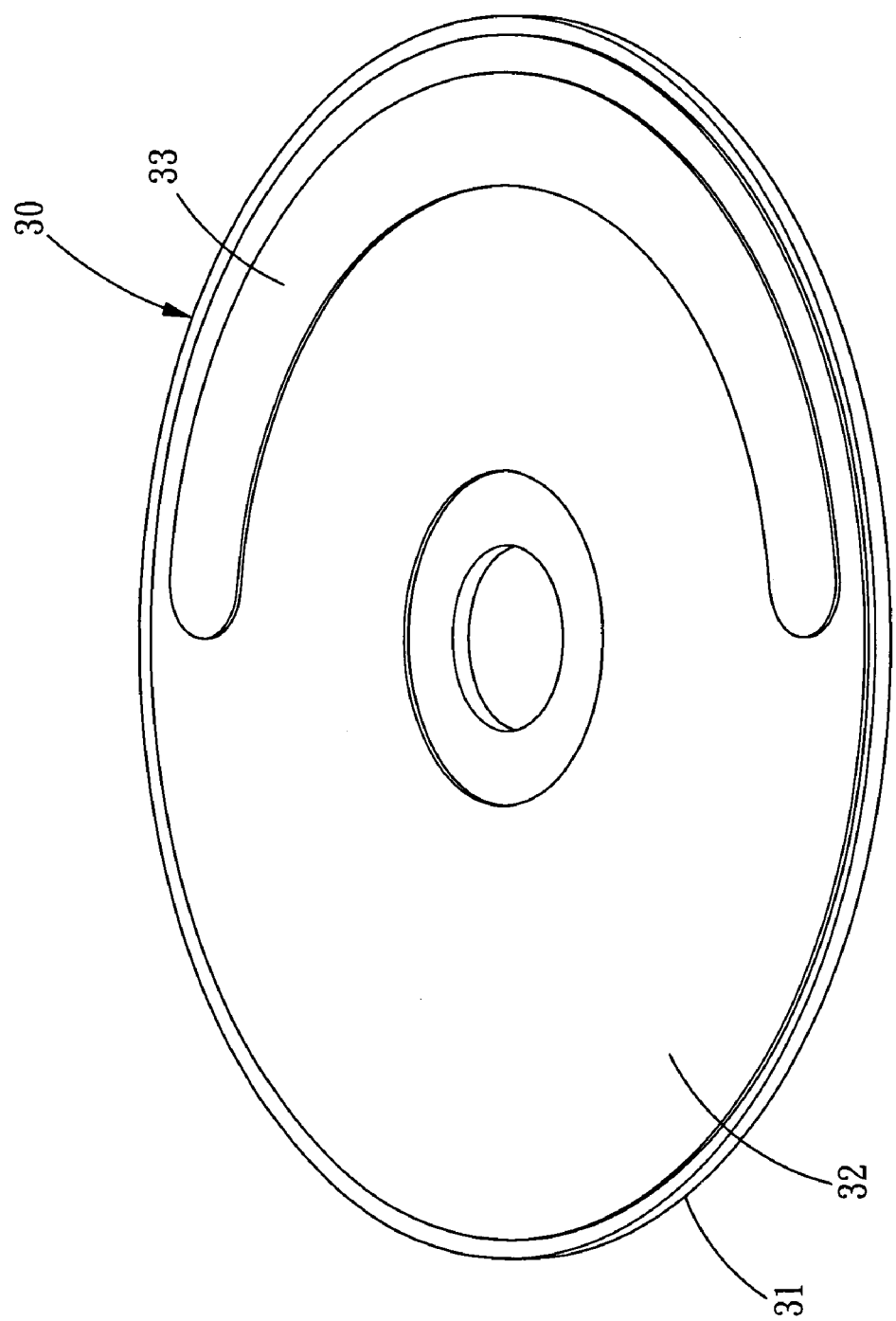
FIG. 3 is a perspective view of a beam imprinting disk in accordance with the present invention, wherein a paint printing layer is arc-shaped.
Figure 4:
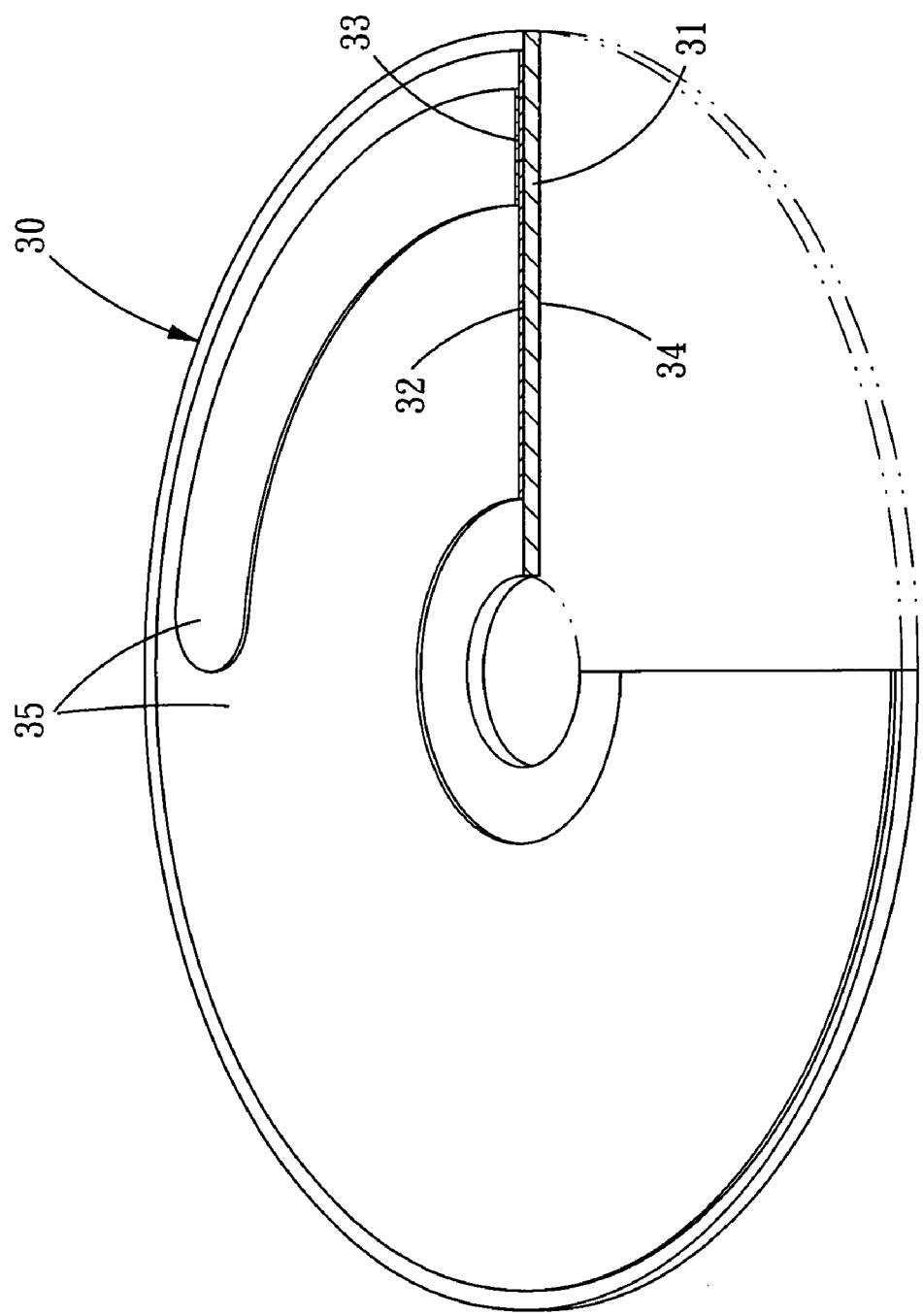
FIG. 4 is a perspective and a partial cross sectional view of the beam imprinting disk in accordance with the present invention.
Figure 5:
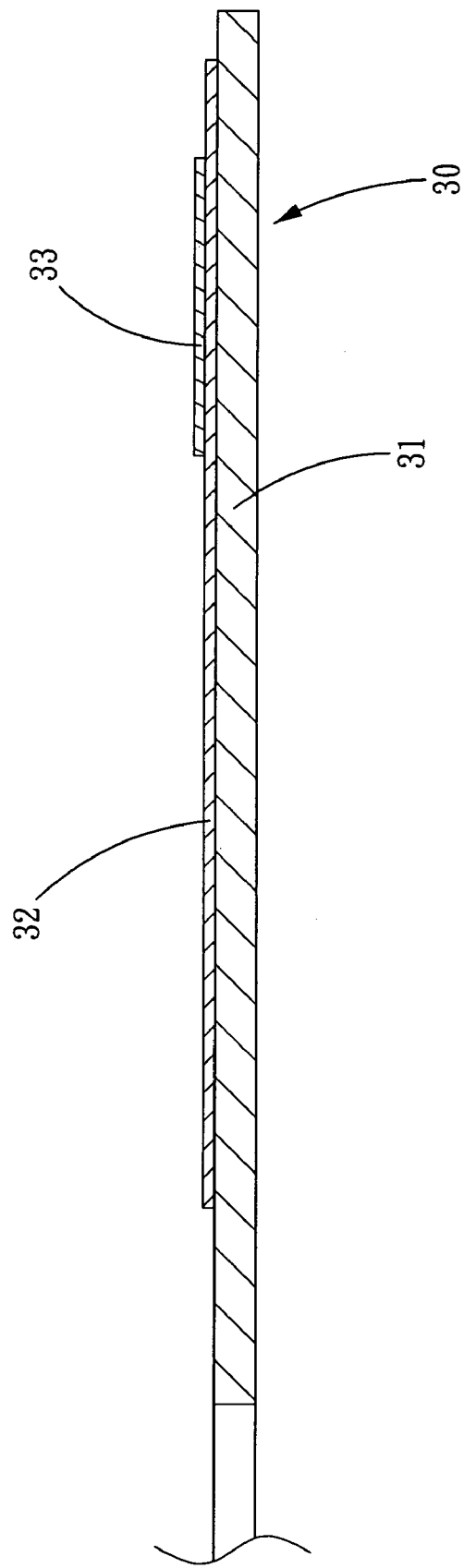
FIG. 5 is a cross sectional view of the beam imprinting disk in accordance with the present invention.

Referring to FIGS. 3-5, a beam imprinting disk 30 in accordance with the present invention is shown, which is provided with a supporting layer 31, a photosensitive printing layer 32 is formed on the supporting layer 31, and a paint printing layer 33 is formed on the photosensitive printing layer 32. One surface of the disk 30 is a data-rewriting surface 34 for writing data, and the other surface of the disk 30 is a label predetermined surface 35 for setting patterns and words.

The supporting layer 31 is made of transparent plastic material.

The photosensitive printing layer 32 is disposed on the label predetermined surface 35 of the disk 30, which allows an optical disk drive to rewrite or read the data via the supporting layer 31 when passing through the data-rewriting surface 34 of the disk 30, or to perform beam imprinting directly via the label predetermined surface 35, so as to show the labels of words or patterns on the photosensitive printing layer 32, and the words or patterns are visually presented by the label predetermined surface 35.

The paint printing layer 33 is partially disposed on and superposed with the photosensitive printing layer 32 of the label predetermined surface 35, so that the user can simultaneously see the photosensitive printing layer 32 and the paint printing layer 33 from the label predetermined surface 35. The paint printing layer 33 is provided for supplying the labels that are sprayed with words or patterns by an ink jet printer.

Figure 6:
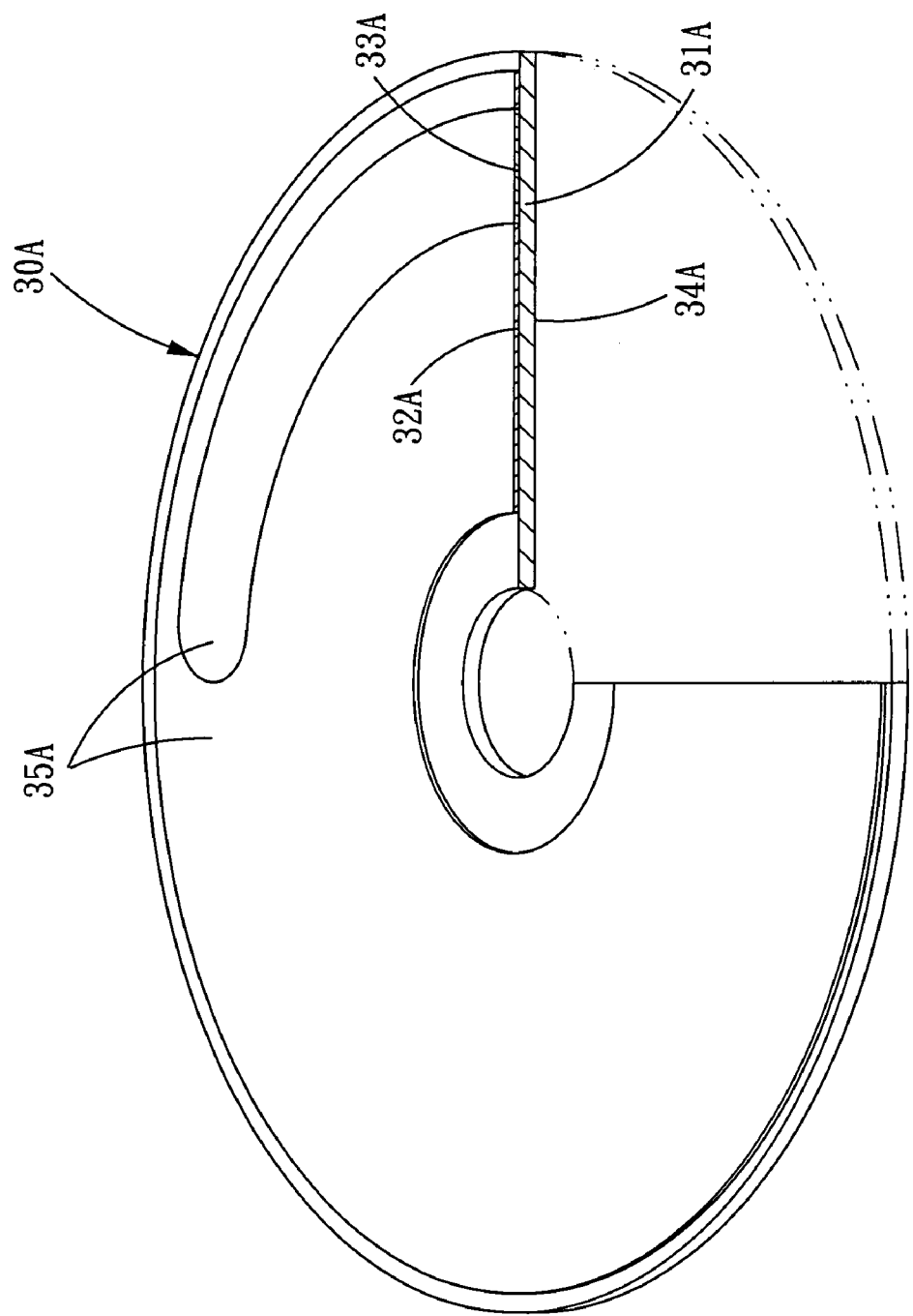
FIG. 6 is a perspective and a partial cross sectional view of another beam imprinting disk in accordance with the present invention.
Figure 7:
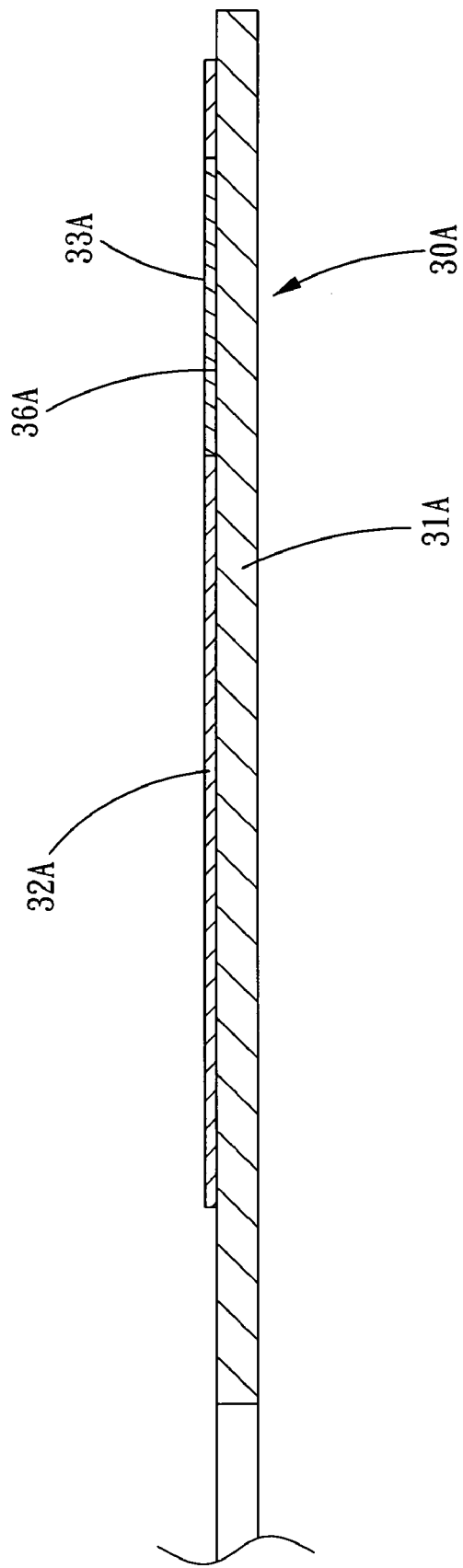
FIG. 7 is a cross sectional view of another beam imprinting disk in accordance with the present invention.

Referring to FIGS. 6 and 7, another disk 30A is shown, which is provided with a supporting layer 31A, a photosensitive printing layer 32A is formed on the supporting layer 31A, and a paint printing layer 33A is partially formed on the supporting layer 31A. One surface of the disk 30A is a data-rewriting surface 34A for writing data, and the other surface of the disk 30A is a label predetermined surface 35 for setting patterns and words.

The supporting layer 31A is made of transparent plastic material.

The photosensitive printing layer 32A is disposed on the label predetermined surface 35A of the disk 30A, which allows the optical disk drive to rewrite or read the data via the supporting layer 31A when passing through the data-rewriting surface 34A of the disk 30A, or to perform beam imprinting directly via the label predetermined surface 35A, so as to show the labels of words or patterns on the photosensitive printing layer 32A, and the words or patterns are visually presented by the label predetermined surface 35A.

The paint printing layer 33A is partially formed on the label predetermined surface 35A of the disk 30A and is located at the same layer with the photosensitive printing layer 32A. Near an outer periphery of the photosensitive printing layer 32A is formed a space 36A for receiving the paint printing layer 33A, so that the user can simultaneously see the photosensitive printing layer 32A and the paint printing layer 33A from the label predetermined surface 35A. An inner periphery of the photosensitive printing layer 32A is provided for rewriting data or performing beam imprinting. The paint printing layer 33A is provided for supplying the labels that are sprayed with words or patterns by the ink jet printer.

Although the paint printing layer 33A is located at the same layer with the photosensitive printing layer 32A, the paint printing layer 33A is only disposed in the outer periphery of the disk 30A, and a majority of space of the inner periphery of the disk 30A is provided for disposing the photosensitive printing layer 32A, so as to rewrite the data and to perform beam imprinting.

Figure 8:
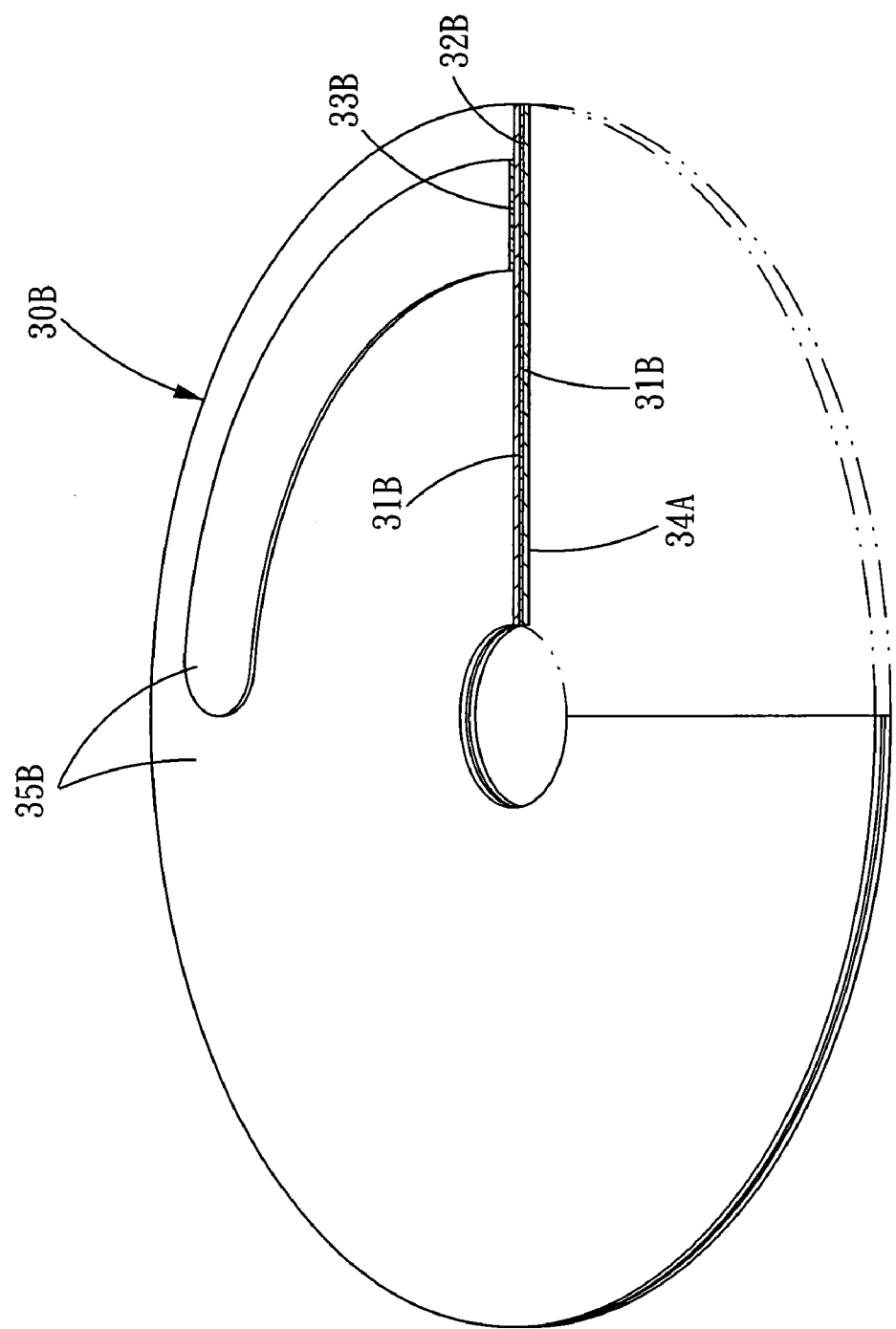
FIG. 8 is a perspective and a partial cross sectional view of a further beam imprinting disk in accordance with the present invention.
Figure 9:
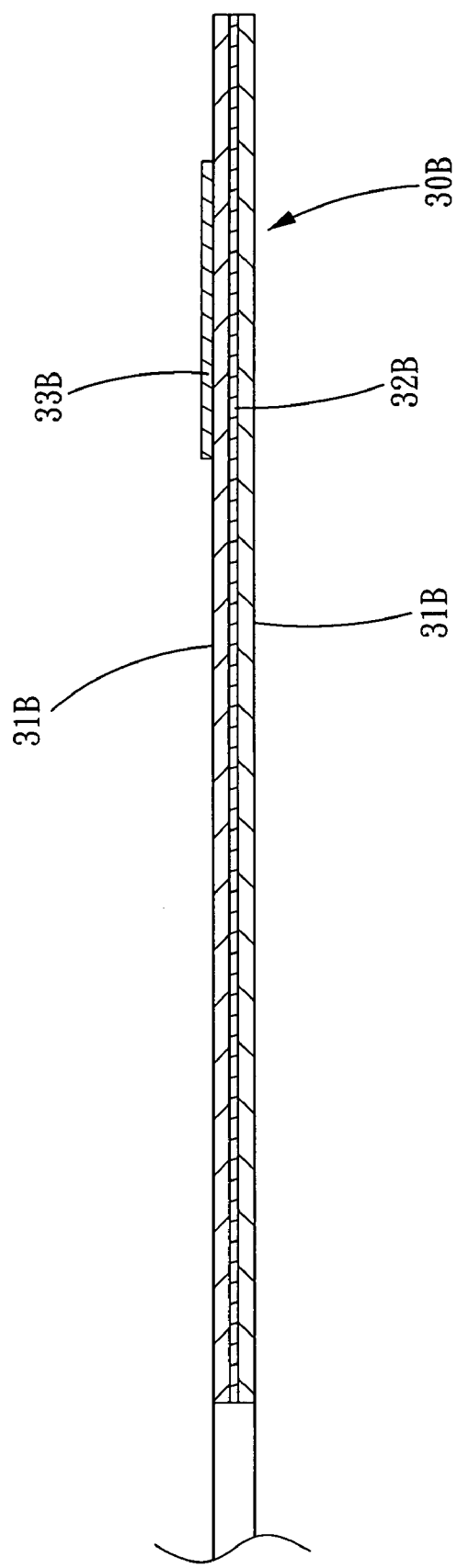
FIG. 9 is a cross sectional view of the further beam imprinting disk in accordance with the present invention.

Referring to FIGS. 8 and 9, a further disk 30B is shown, which is provided with two supporting layers 31B, a photosensitive printing layer 32B is formed between the supporting layers 31B, and a paint printing layer 33B is formed on one of the supporting layers 31B. One surface of the disk 30B is a data-rewriting surface 34B for writing data, and the other surface of the disk 30B is a label predetermined surface 35B for setting patterns and words.

The supporting layer 31B is made of transparent plastic material.

The photosensitive printing layer 32B is disposed between the supporting layers 31B of the disk 30B, which allows the optical disk drive to rewrite or read the data via one of the supporting layers 31B when passing through the data-rewriting surface 34B of the disk 30B, or to perform beam imprinting directly via the other supporting layer 31B when passing through the label predetermined surface 35B, so as to show the labels of words or patterns on the photosensitive printing layer 32B, and the words or patterns are visually presented by the label predetermined surface 35B.

The paint printing layer 33B is partially disposed on one of the supporting layers 31B of the label predetermined surface 35B and is superposed with the photosensitive printing layer 32B, so that the user can simultaneously see the photosensitive printing layer 32B and the paint printing layer 33B from the label predetermined surface 35B. The paint printing layer 33B is provided for supplying the labels that are sprayed with words or patterns by an ink jet printer.

Figure 10:
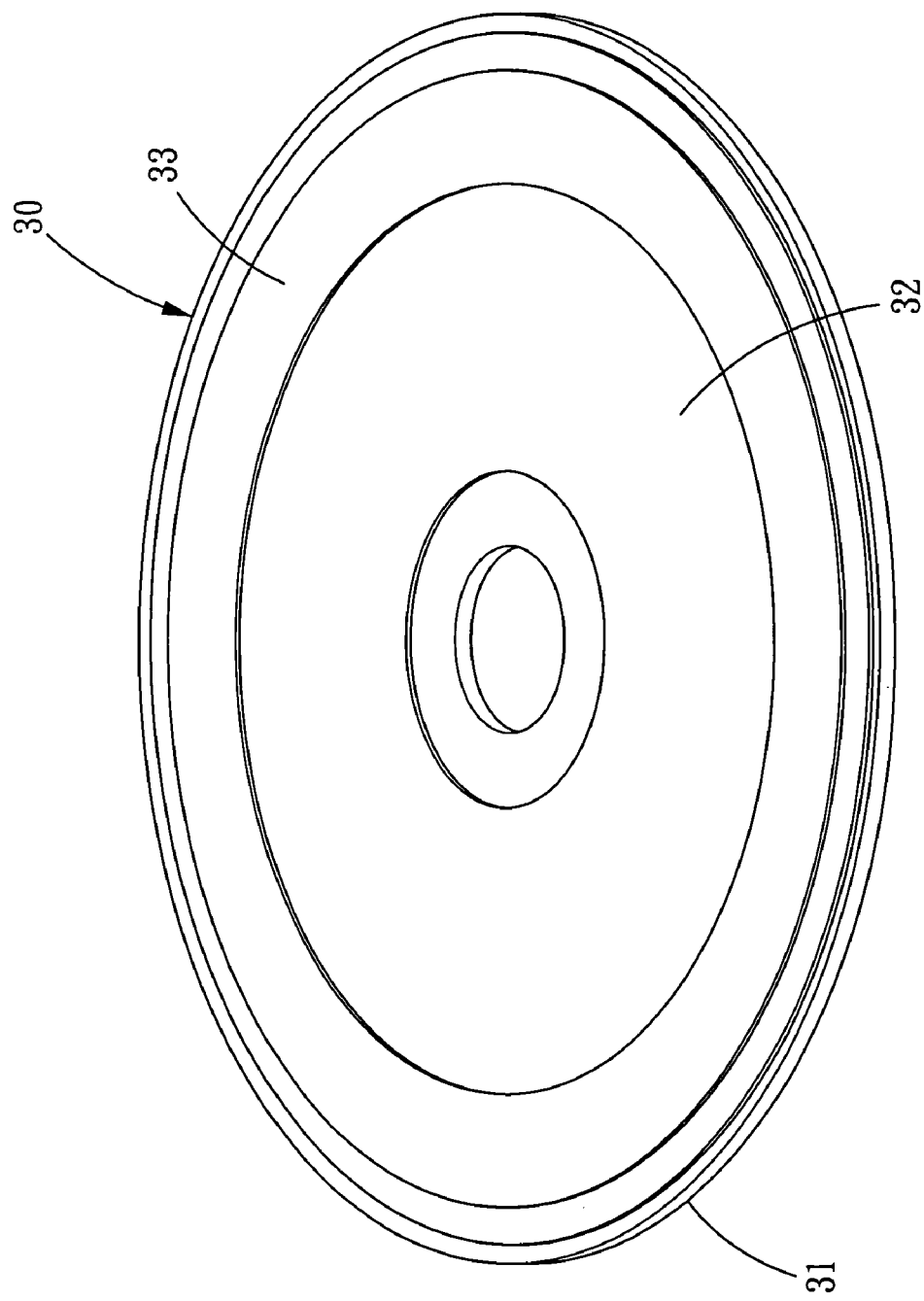
FIG. 10 is a perspective view of the beam imprinting disk in accordance with the present invention, wherein the paint printing layer is annular.

The paint printing layers 33, 33A and 33B are partially disposed and can be a part of an arc-shaped segment, or a part of an annular member, or more than two blocks as long as they not influence the rewriting and reading of the date or partial beam imprinting. The paint printing layer 33 is designed to be arc-shaped as shown in FIG. 3 or is designed to be annular-shaped as shown in FIG. 10.

It is apparent from the above-mentioned descriptions that the present invention has the advantages described as follows: the paint printing layer 33 is partially disposed on the photosensitive printing layer 32 of the disk 30, so that the user can simultaneously see the photosensitive printing layer 32 and the paint printing layer 33 from the label predetermined surface 35. At the same time, the beam imprinting can be performed to set the labels or patterns on the photosensitive printing layer 32, and the ink jet printer can be used to spray the labels or patterns on the paint printing layer 33. By such two methods, the disk 30 is applicable to the ink jet printer or the beam imprinting optical disk drive, so that the present invention has a wide range of application and can meet different user's requirements.

While we have shown and described various embodiments in accordance with the present invention, it should be clear to those skilled in the art that further embodiments may be made without departing from the scope of the present invention.

What is claimed is:

1. A beam imprinting disk being provided with a supporting layer, a photosensitive printing layer being formed on the supporting layer, a paint printing layer being partially formed on the photosensitive printing layer, wherein:

one surface of the disk is a data-rewriting surface for writing data, the other surface of the disk is a label predetermined surface for setting patterns and words;

the supporting layer is made of transparent plastic material;

the photosensitive printing layer allows an optical disk drive to rewrite or read the data when passing through the data-rewriting surface of the disk, and to perform beam imprinting via the label predetermined surface, so as to show labels of words or patterns on the photosensitive printing layer, the words or patterns are visually presented by the label predetermined surface;

the paint printing layer is partially disposed on the label predetermined surface, so that the user can simultaneously see the photosensitive printing layer and the paint printing layer from the label predetermined surface, and the paint printing layer is provided for supplying the labels that are sprayed with words or patterns.

2. The beam imprinting disk as claimed in claim 1, wherein the disk comprises the one supporting layer, the paint printing layer is formed on the photosensitive printing layer, the photosensitive printing layer is disposed on the label predetermined surface of the disk, which allows the optical disk drive to rewrite or read the data via the supporting layer when passing through the data-rewriting surface of the disk, and to perform beam imprinting directly via the label predetermined surface, and the paint printing layer is partially superposed with the photosensitive printing layer.

3. A beam imprinting disk being provided with a supporting layer, a photosensitive printing layer being formed on the supporting layer, and a paint printing layer being partially formed on the supporting layer, wherein:

one surface of the disk is a data-rewriting surface for writing data, the other surface of the disk is a label predetermined surface for setting patterns and words;

the supporting layer is made of transparent plastic material;

the photosensitive printing layer is disposed on the label predetermined surface of the disk, which allows the optical disk drive to rewrite or read the data via the supporting layer when passing through the data-rewriting surface of the disk, and to perform beam imprinting directly via the label predetermined surface, the paint printing layer is partially formed on the label predetermined surface of the disk and is located at the same layer with the photosensitive printing layer, and near an outer periphery of the photosensitive printing layer is formed a space for receiving the paint printing layer.

4. A beam imprinting disk being provided with a supporting layer, a photosensitive printing layer, and a paint printing layer, wherein:

one surface of the disk is a data-rewriting surface for writing data, the other surface of the disk is a label predetermined surface for setting patterns and words;

the supporting layer is made of transparent plastic material;

wherein the disk further comprises another supporting layers the photosensitive printing layer is formed between the two supporting layers, the photosensitive printing layer allows the optical disk drive to rewrite or read the data via one of the supporting layers when passing through the data-rewriting surface of the disk, or to perform beam imprinting directly via the other supporting layer when passing through the label predetermined surface, and the paint printing layer is partially disposed on one of the supporting layers and is superposed with the photosensitive printing layer.

5. The beam imprinting disk as claimed in claim 1, wherein the paint printing layer is selected from the group consisting of a part of an arc-shaped segment, a part of an annular member and more than two blocks.

\* \* \* \* \*